(12) United States Patent
Lu

(10) Patent No.: US 6,796,541 B2
(45) Date of Patent: Sep. 28, 2004

(54) SUPPORT FOR AN LCD MONITOR

(75) Inventor: Sheng-Nan Lu, Taipei Hsien (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 223 days.

(21) Appl. No.: 10/230,069

(22) Filed: Aug. 29, 2002

(65) Prior Publication Data

US 2004/0041851 A1 Mar. 4, 2004

(51) Int. Cl.[7] .............................. E04G 3/00; E05D 11/08
(52) U.S. Cl. ..................... 248/291.1; 16/340; 16/342; 248/917
(58) Field of Search ................. 248/917, 918, 248/919, 920, 291.1, 677, 292.14; 16/340, 337, 342; 361/681

(56) References Cited

U.S. PATENT DOCUMENTS

| | | | | |
|---|---|---|---|---|
| 5,269,047 A | * | 12/1993 | Lu | 16/340 |
| 5,473,794 A | * | 12/1995 | Kobayashi | 16/337 |
| 5,812,368 A | * | 9/1998 | Chen et al. | 361/681 |
| 5,906,010 A | * | 5/1999 | Suzuki | 4/236 |
| 6,018,847 A | * | 2/2000 | Lu | 16/337 |
| 6,378,830 B1 | * | 4/2002 | Lu | 248/278.1 |
| 6,539,582 B1 | * | 4/2003 | Chae | 16/340 |
| 6,622,344 B1 | * | 9/2003 | Lu | 16/342 |
| 6,666,422 B1 | * | 12/2003 | Lu et al. | 248/291.1 |
| 6,671,927 B2 | * | 1/2004 | Chen | 16/339 |
| 6,671,928 B2 | * | 1/2004 | Huang | 16/340 |
| 6,688,572 B2 | * | 2/2004 | Huang et al. | 248/291.1 |
| 6,698,063 B2 | * | 3/2004 | Kim et al. | 16/337 |

* cited by examiner

Primary Examiner—Leslie A. Braun
Assistant Examiner—Tan Le
(74) Attorney, Agent, or Firm—Fei-Fei Chao; Venable LLP (57) ABSTRACT

A support for an LCD monitor is composed of two seats, a pivoting member, a positioning member, and a leg. The seats are mounted on a back of the LCD monitor. The pivoting member is pivotally mounted between the seats. The positioning member is mounted on one of the seats. The leg is secured on the pivoting member. The leg can be pivoted to extend for supporting the LCD monitor or fold up for packing and storing.

7 Claims, 11 Drawing Sheets

SUPPORT FOR AN LCD MONITOR

BACKGROUND OF THE INVENTION

1. Field of the Invention

The present invention is related to an LCD monitor, and more particularly to a support for an LCD monitor.

2. Description of Related Art

Because of high displaying quality and small size, LCD monitors have been selected by lots of customers as displaying devices for computers. A conventional LCD monitor generally has a seat for supporting a screen. The screen is pivotally mounted on the seat. However, the seat cannot be pivoted to abut the screen, and an overall size of the LCD monitor cannot be reduced. Thus, the LCD monitor will occupy a large packing space, which is inconvenient and uneconomical to store and transport.

Therefore, the invention provides a folding support for an LCD monitor to mitigate and/or obviate the aforementioned problems.

SUMMARY OF THE INVENTION

The main objective of the invention is to provide a support for an LCD monitor that can be folded to reduce an overall size of the monitor for packing or storing.

Other objects, advantages and novel features of the invention will become more apparent from the following detailed description when taken in conjunction with the accompanying drawings.

DETAILED DESCRIPTION OF THE PREFERRED EMBODIMENT

Figure 1:
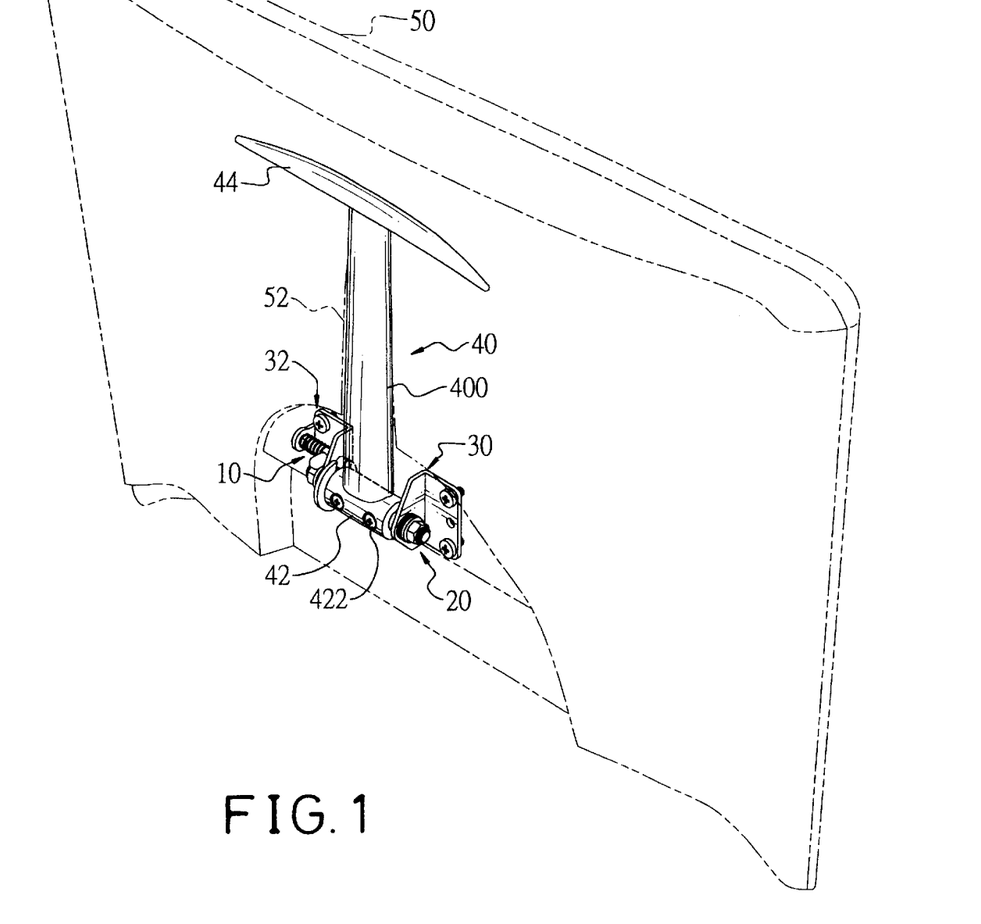
FIG. 1 is a perspective view of a support in accordance with the invention folded up at a back of an LCD monitor.

Referring to FIG. 1, a support in accordance with the present invention is pivotally mounted on a back of an LCD monitor (50). The support is composed of a positioning member (10), a pivoting member (20), a first seat (30), a second seat (32), and a leg (40). The pivoting member (20) is provided between the first seat (30) and the second seat (32). The positioning member (10) is provided on the second seat (32). The leg (40) can be pivoted to receive in a recess (52) defined at the back of the monitor (50).

Figure 2:
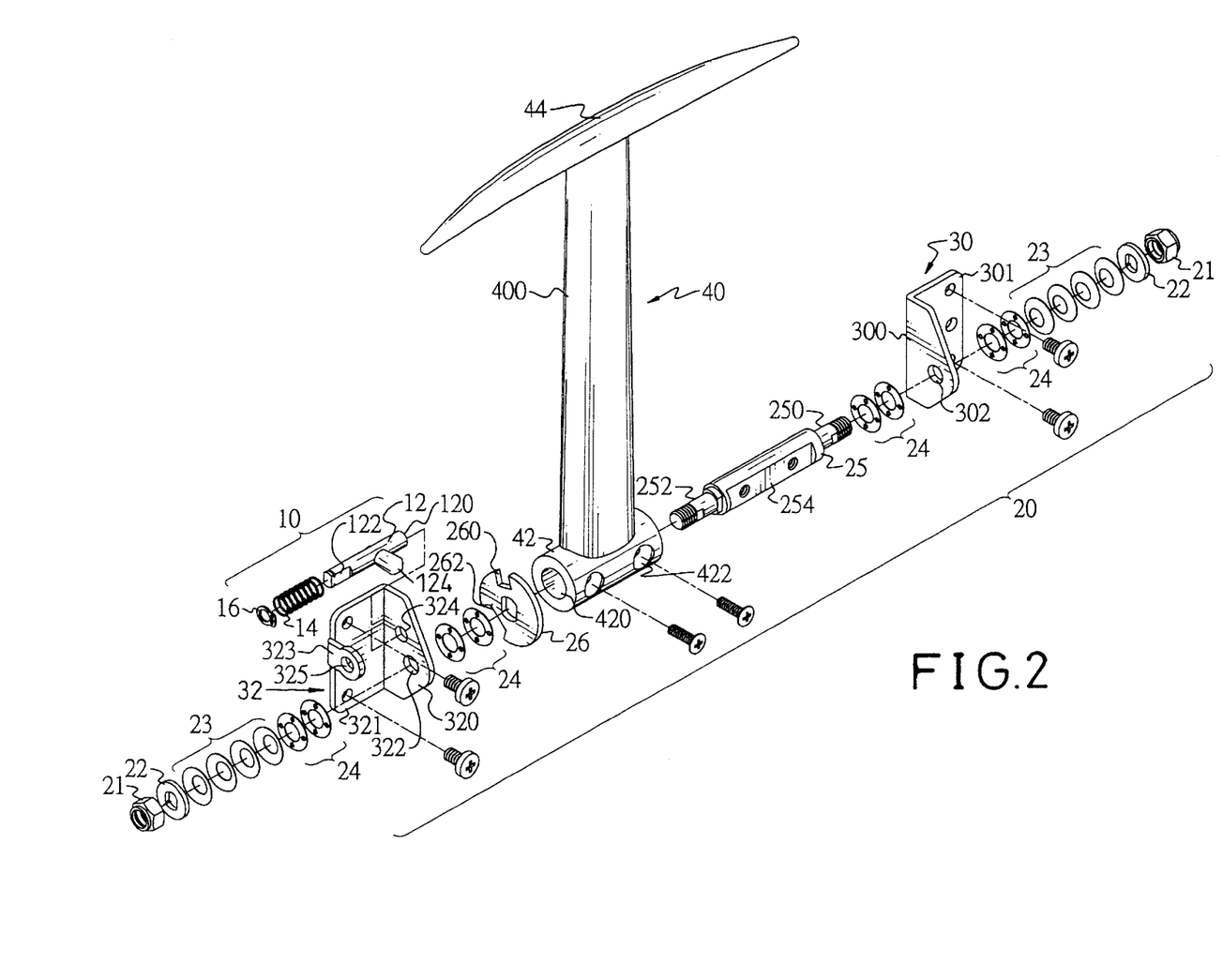
FIG. 2 is an exploded perspective view of the support in FIG. 1.

Referring to FIG. 2, the pivoting member (20) is pivotally mounted between the first seat (30) and the second seat (32). The first seat (30) has a first plate (301) with a plurality of holes (not numbered) defined therethrough, and has a first ear (300) perpendicular to the first plate (301). A first aperture (302) is defined through the first ear (300). The second seat (32) has a second plate (321) with a plurality of holes (not numbered) defined therethrough, and has a second ear (320) perpendicular to the second plate (321). A second aperture (322) is defined through the second ear (320). A third ear (323) is formed on a side of the second plate (321) opposite to the second ear (320) and parallel to the second ear (320). A third aperture (325) is defined through the third ear (323), and a fourth aperture (324) is defined through the second ear (320) and aligned with the third aperture (325).

The first and second seats (30, 32) are mounted on the back of the LCD monitor (50) by screws (not numbered) through these holes of the plates (300, 320) respectively.

The pivoting member (20) has an axle (25) with a first end (250) and a second end (252). Threads are respectively formed, on the first end (250) and the second end (252) of the axle (25). A flat surface (254) is formed at a middle part of the pivoting member (20) and has at least one threading hole (not numbered) radially defined therein.

The first end (250) of the axle (25) extends through the first aperture (302) of the first ear (300) and pivotally mounted on the first seat (30) by a nut (21) engaged with the first end (250). A damper (23) including a plurality of damping disks (not numbered) is provided on the first end (250) of the axle (25) and between the first ear (300) and the nut (21). A washer (22) is provided between the nut (21) and the damper (23). Two pairs of gaskets (24) are respectively provided between the damper (23) and the first ear (300) and between the first ear (300) and the middle part of the axle (25).

The second end (252) of the axle (25) extends through the second aperture (322) of the second ear (320) and pivotally mounted on the second seat (32) by another nut (21) engaged with the second end (252). Another damper (23) is provided on the second end (252) of the axle (25) and between the second ear (320) and the other nut (21). Another washer (22) is provided between the other nut (21) and the other damper (23). A positioning disk (26) is provided between the second ear (320) and the middle part of the axle (25). A first notch (260) and a second notch (262) are defined at the circumference of the positioning disk (26), wherein a width of the first notch (260) is smaller than a width of the second notch (262). Other two pairs of gaskets (24) are respectively provided between the other damper (23) and the second ear (320) and between the second ear (320) and the positioning disk (26).

The positioning member (10) has a rod (12) longitudinally movably mounted between the second ear (320) and the third ear (323). The rod (12) has a positioning end (120) extending through the fourth aperture (324) of the second ear (320), and an installing end (122) extending through the third aperture (325). A lug (124) is formed on the rod (12), and a resilient member (14) is provided on the rod (12) and between the lug (124) and the third ear (323). A collar (16) is mounted on the installing end (122) outside the third ear (323) to fasten the rod (12). The positioning end (120) is alternatively located in the first notch (260) or the second notch (262) of the positioning disk (26).

The leg (40) has a shank (400). A tube (42) and a leg (44) are respectively formed at two ends of the shank (400). A passage (420) is defined through the tube (42) and the axle (25) extends through the passage (420). At least one opening (422) is radially defined through the tube (42) and aligned with the threading hole of the axle (25). At least one screw is inserted through the opening (422) and engaged in the threading hole to fasten the axle (20) in the tube (42). The positioning disk (26) is located between the tube (42) and the second seat (32).

Figure 3:
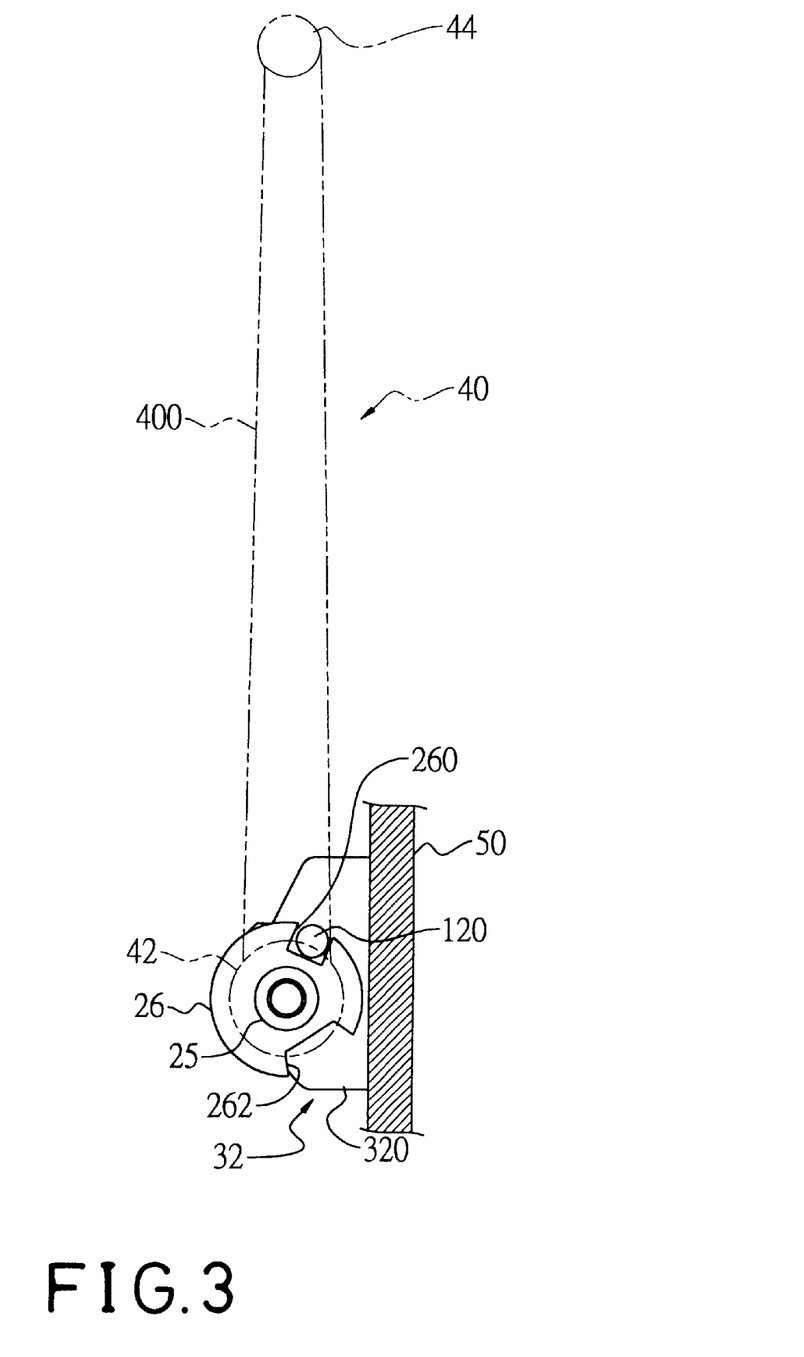
FIG. 3 is a cross sectional view of the support along the line "3—3" in FIG. 4.
Figure 4:
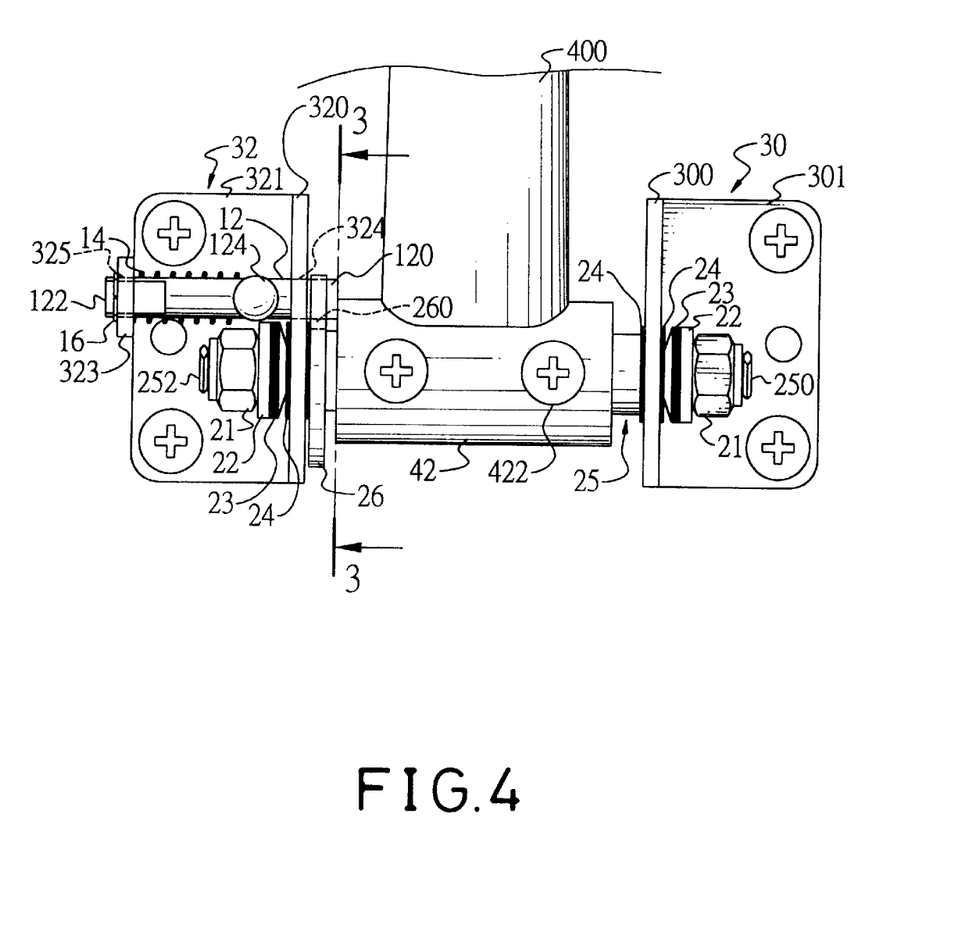
FIG. 4 is a partial top view of the support in FIG. 1 showing a rod of a positioning member engaged in a positioning disk.
Figure 5:
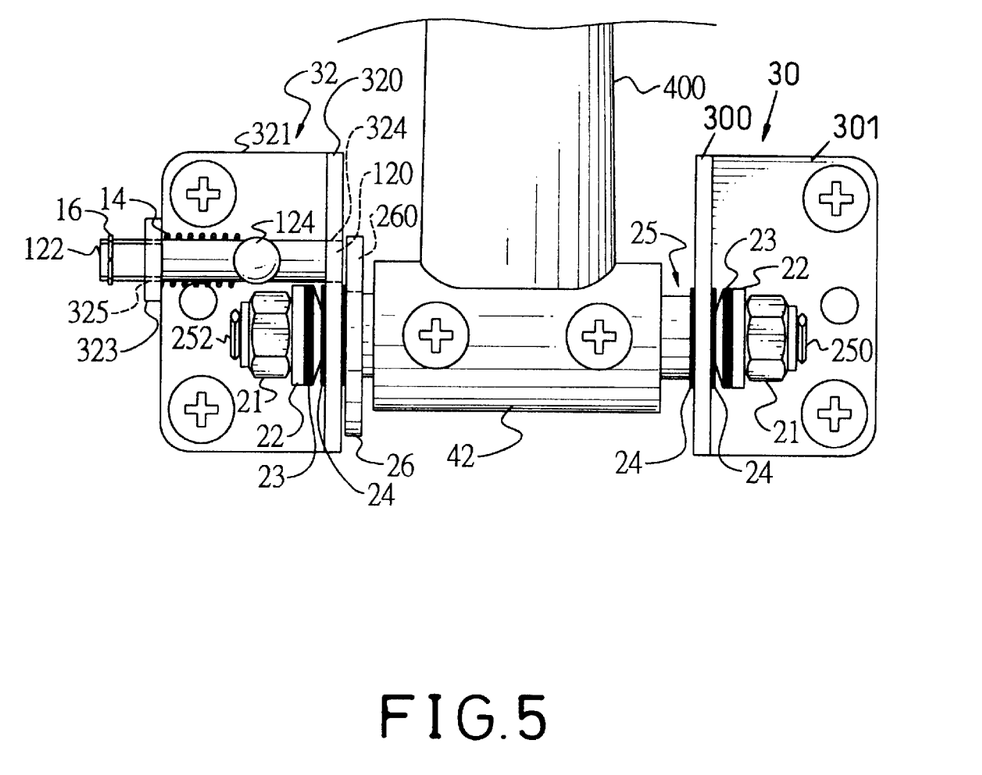
FIG. 5 is another partial top view of the support in FIG. 1 showing the rod disengaged from the positioning disk.
Figure 6:
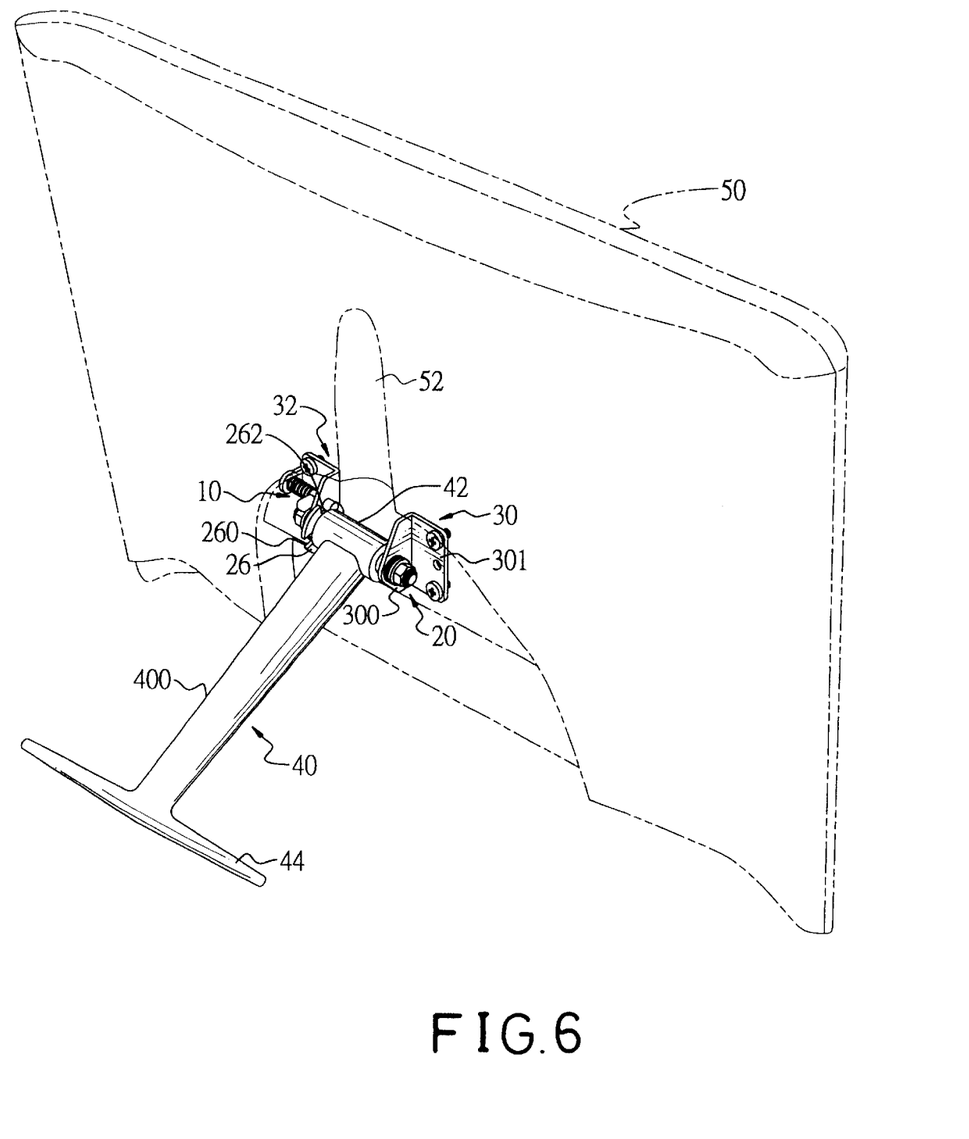
FIG. 6 is a perspective view of the support in FIG. 1 in a using status.
Figure 7:
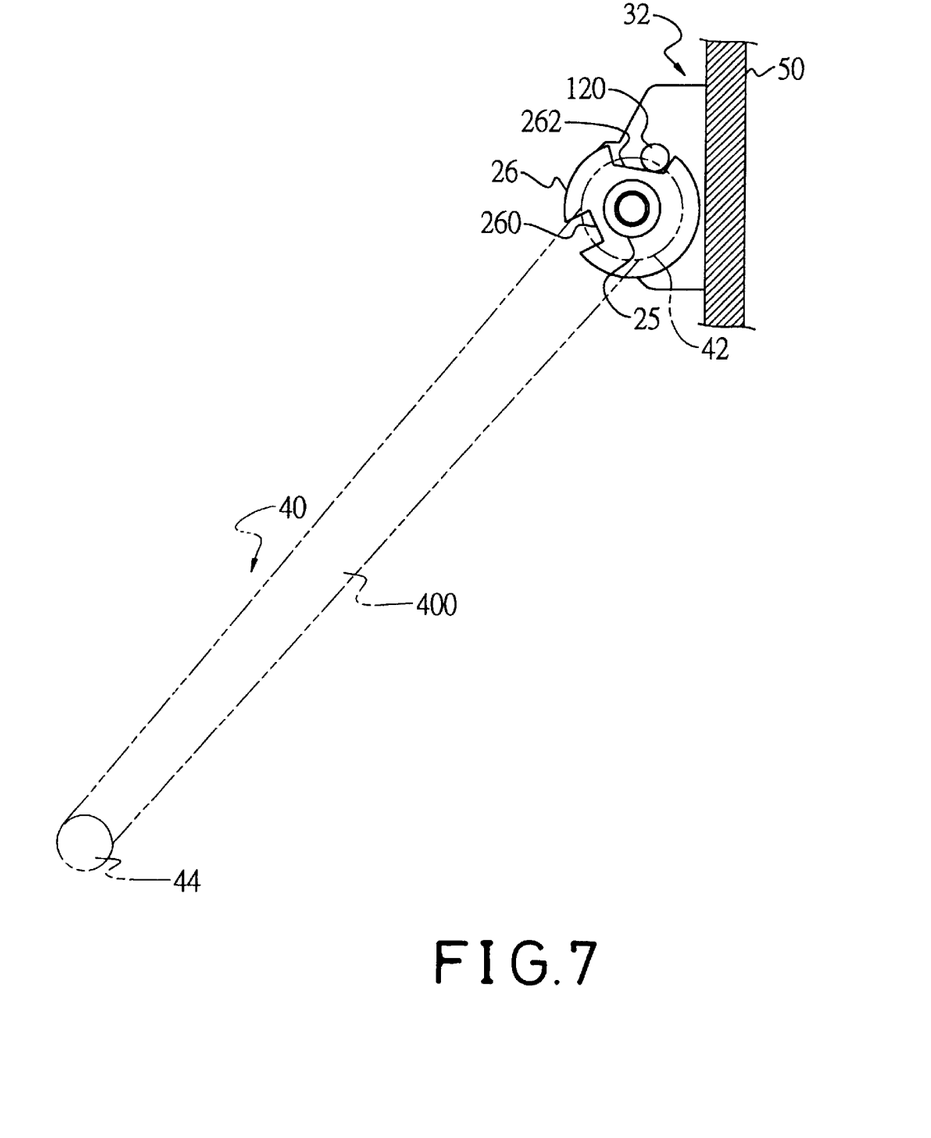
FIG. 7 is a cross sectional view of the support in FIG. 1 in the using status along the line "3—3" in FIG. 4.
Figure 8:
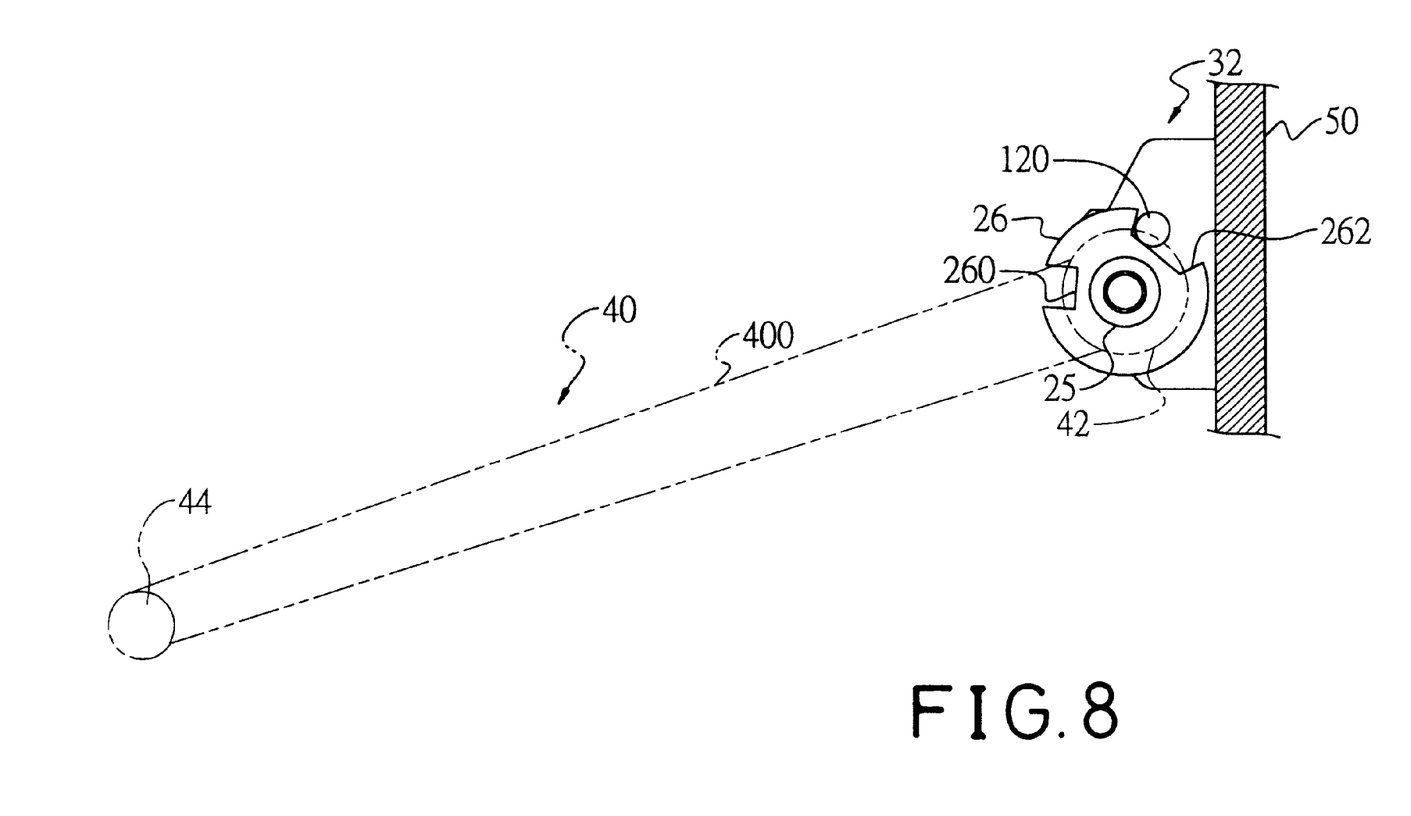
FIG. 8 is another cross sectional view of the support in FIG. 1 in the using stature along the line "3—3" in FIG. 4.

With reference to FIGS. 3–4, when the leg (40) is folded up, the positioning end (120) of the rod (12) extending out from the fourth aperture (324) is located in the first notch (260) of the positioning disk (26) to disable the leg (40) to pivot down.

With reference to FIGS. 5–8, when a user holds the lug (124) to move the rod (12) towards the third ear (323), the positioning end (120) is disengaged from the first notch (260), and the leg (40) can be pivoted downwards. When the second notch (262) is aligned with the fourth aperture (324), the user releases the rod (12) and the positioning end (120) extends in the second notch (262) under the force of the resilient member (14). Therefore, the leg (40) is positioned and the LCD monitor (50) can be stably supported by the leg (40).

When the user wants to fold the leg (40), the rod (12) is moved towards the third ear (323) again, and the positioning end (120) is disengaged from the second notch (262). Therefore, the leg (40) can be pivoted upwards to receive in the recess (52) of the LCD monitor (50), as shown in FIG. 1.

Figure 9:
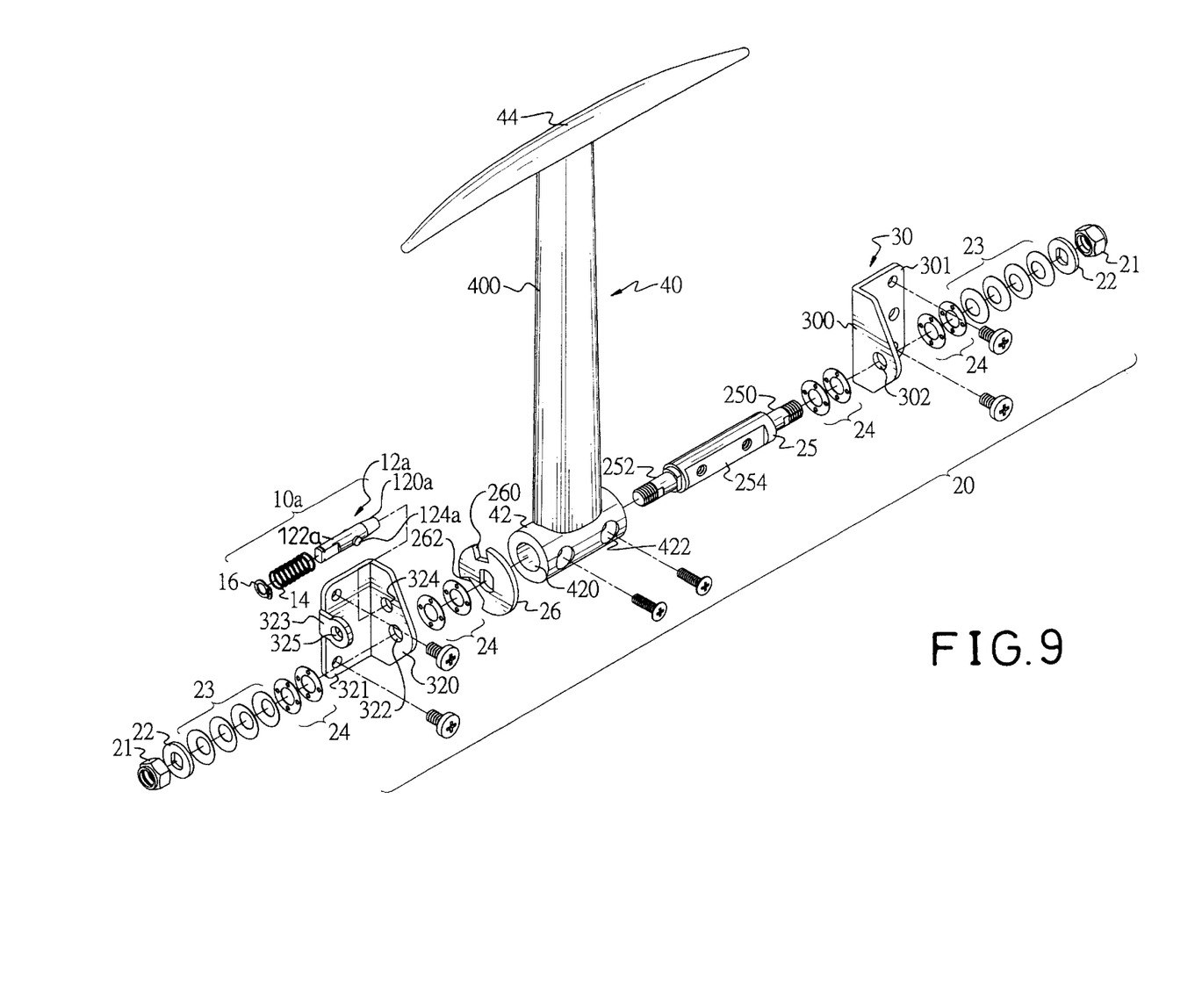
FIG. 9 is an exploded perspective view of another embodiment of the support in accordance with the invention.
Figure 10:
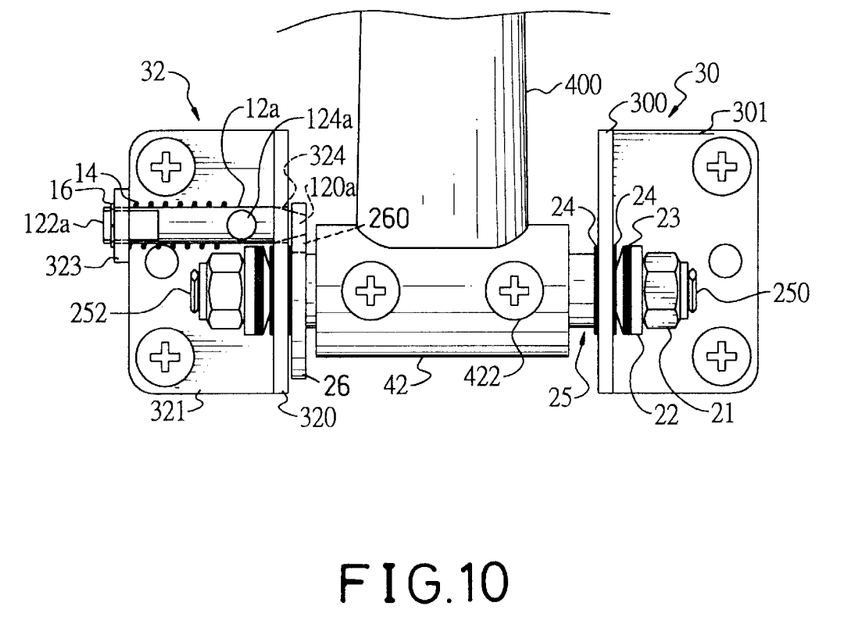
FIG. 10 is a partial top view of the support in FIG. 9 showing a rod of a positioning member engaged in a positioning disk.
Figure 11:
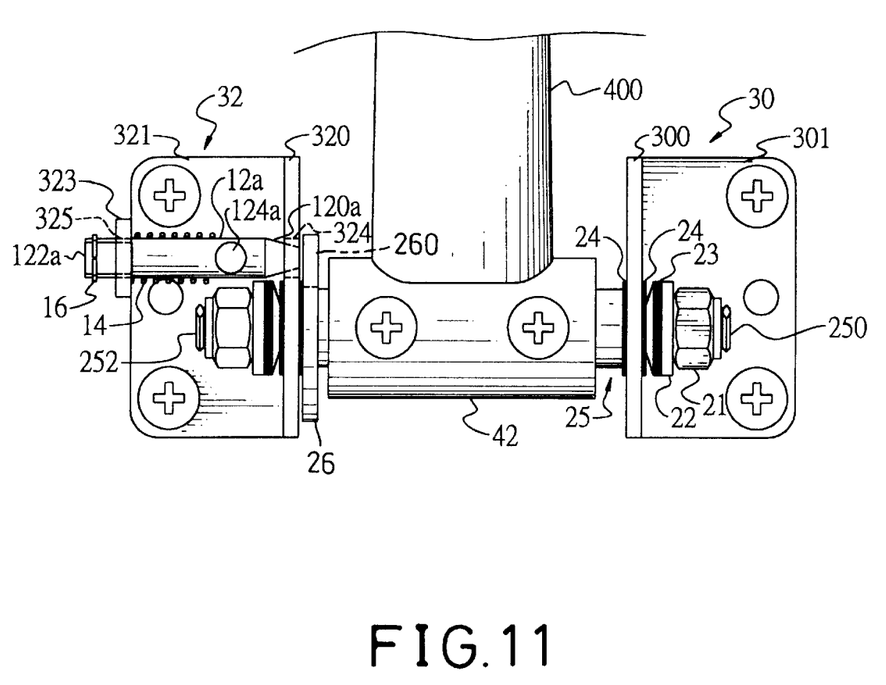
FIG. 11 is another partial top view of the support in FIG. 9 showing the rod disengaged from the positioning disk.

With reference to FIGS. 9–11, in a second embodiment of the present invention, the support has a positioning member (10a) different from that of the embodiment described hereinbefore. The positioning member (10a) has a rod (12a) with a positioning end (120a) formed as a cone and an installing end (122a). A lug (124a) is formed on the rod (12a).

The positioning end (120a) extends through the fourth aperture (324) of the third ear (320), and is alternatively located in the first notch (260) or the second notch (262) of the positioning disk (26). When the user pivots the leg (40), the cone surface of the positioning end (120a) is pushed by the positioning disk (26), and the rod (12a) is gradually moved towards the third ear (323) and disengaged from the notches (260, 262). Therefore, the user can directly pivot the leg (40) without holding the lug (124a) to move the rod (12a).

According to the present invention, the leg of the support can be pivoted to reduce the overall size of the LCD monitor, which is very convenient to pack, store, and transport the LCD monitor.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A support for an LCD monitor, the support comprising:
a first seat (30) having
a first plate (301) and
a first ear (300) perpendicular to said first plate (301), said first ear (300) having a first aperture (302) define through said first ear (300);
a second seat (32) having
a second plate (321),
a second ear (320) perpendicular to said second plate (321), the second ear (320) having a second aperture (322) define through said second ear (320), and
a third ear (323) parallel to said second ear (320) and formed at a side of said second plate (321) opposite to said second ear (320), said third ear (323) having a third aperture (325) defined through said third ear (323) and aligned with a fourth aperture (324) define through said second ear (320);
a pivoting member (20) pivotally mounted between said first seat (30) and said second seat (32), said pivoting member (20) having
an axle (25) having a first end (250) extending through said first aperture (302) of said first ear (300) and fastened by a fastener (21), a second end (252) extending through said second aperture (322) of said second ear (320) and fastened by another fastener (21), and at least one threading hole defined in a middle part of said axle (25), and
a positioning disk (26) provided on said the axle (25) and located between said the second ear (320) and said middle part, said positioning disk (26) having a first notch (260) and a second notch (262) defined at a circumference of said positioning disk (26);
a positioning member (10) longitudinally movably mounted between said second ear (320) and said third ear (323), said positioning member (10) having
a rod (12), said rod (12) having a positioning end (120) extending through said fourth aperture (324) of said second ear (320), an installing end (122) extending through said third aperture (325) of said third ear (323), and a lug (124) formed on the rod (12),
a resilient member (14) provided on said rod (12) and between said third ear (323) and said lug (124), and
a collar (16) provided on said installing end (122) outside said third ear (323) to fasten said rod (12); and
a leg (40) mounted between said first seat (30) and said second seat (32), said leg having
a shank (400),
a foot (44) formed at a first end of the shank (400) and perpendicular to said shank (400), and
a tube (42) formed at a second end of the shank (400) and perpendicular to said shank (400), said tube (42) having
a passage (420) for said axle (25) extending through said tube (42),
at least one opening (422) radially defined through said tube (42) and aligned with said at least one threading hole of said axle (25), and
a screw inserted through said opening (422) and engaged in said threading hole to fasten said axle (25) in said tube (42),
whereby, said positioning end (12) can be alternatively located in said first notch (260) or said second notch (262) to fold said leg (40) for storing or extend said leg (40) for supporting the LCD monitor.

2. The support as claimed in claim 1, wherein said pivoting member (20) further comprises a damper (23) provided on said first end (250) of said axle (25) and between said first ear (300) and said fastener (21); and another damper (23) provided on said second end (252) of said axle (25) and between said second ear (320) and said other fastener (21).

3. The support as claimed in claim 2, wherein said damper (23) comprises a plurality of damping disks.

4. The support as claimed in claim 2, wherein said pivoting member (20) further comprises two pairs of gaskets (24) provided on said first end (250) of said axle (25) and respectively between said first ear (300) and said tube (42) and between said first ear (300) and said damper (23); and other two pairs of gaskets (24) provided on said second end (252) of said axle (25) and respectively between said second ear (320) and said tube (42) and between said second ear (320) and said other damper (23).

5. The support as claimed in claim 2, wherein said pivoting member (20) further comprises two washers (22) respectively provided between said fastens (21) and said dampers (23).

6. The support as claimed in claim 1, wherein said axle (25) further comprises a flat surface (254) formed on said middle part thereof and said threading hole is defined in said flat surface (254).

7. The support as claimed in claim 1, wherein said positioning end (120*a*) is shaped as a cone.

\* \* \* \* \*